United States Patent
Collier-Hallman

(10) Patent No.: US 7,190,135 B2
(45) Date of Patent: Mar. 13, 2007

(54) METHOD OF INVERTER LINEARIZATION IN ELECTRIC MACHINES THROUGH SECONDARY MODULATION

(75) Inventor: Steven James Collier-Hallman, Frankenmuth, MI (US)

(73) Assignee: Delphi Technologies, Inc., Troy, MI (US)

( * ) Notice: Subject to any disclaimer, the term of this patent is extended or adjusted under 35 U.S.C. 154(b) by 82 days.

(21) Appl. No.: 10/458,091

(22) Filed: Jun. 10, 2003

(65) Prior Publication Data

US 2004/0000889 A1    Jan. 1, 2004

Related U.S. Application Data

(60) Provisional application No. 60/391,562, filed on Jun. 26, 2002.

(51) Int. Cl.
   *H02K 23/00*   (2006.01)

(52) U.S. Cl. .................. 318/437; 318/254; 318/599; 318/811

(58) Field of Classification Search ............ 318/437, 318/254, 138, 439, 727, 599, 811
   See application file for complete search history.

(56) References Cited

U.S. PATENT DOCUMENTS

| | | | |
|---|---|---|---|
| 4,047,083 A * | 9/1977 | Plunkett ..................... | 318/807 |
| 4,972,320 A * | 11/1990 | Sugiura et al. ............... | 701/43 |
| 5,329,217 A * | 7/1994 | Kerkman et al. ............ | 318/811 |
| 5,589,805 A | 12/1996 | Zuraski et al. | |
| 5,610,806 A * | 3/1997 | Blasko et al. ................. | 363/41 |
| 5,657,216 A * | 8/1997 | Kaura .......................... | 363/41 |
| 5,736,825 A * | 4/1998 | Kaura et al. ................. | 318/599 |
| 5,900,706 A * | 5/1999 | Hisa ............................. | 318/437 |
| 6,198,296 B1 | 3/2001 | Ivanov | |
| 6,208,497 B1 | 3/2001 | Seale et al. | |
| 6,225,774 B1 * | 5/2001 | Masaki et al. ............... | 318/723 |
| 6,232,730 B1 * | 5/2001 | Doyama et al. ............. | 318/254 |
| 6,281,656 B1 * | 8/2001 | Masaki et al. ............... | 318/700 |
| 6,288,814 B1 | 9/2001 | Blauvelt | |
| 6,307,336 B1 * | 10/2001 | Goff et al. .................... | 318/254 |
| 6,337,599 B2 | 1/2002 | Lee | |
| 6,340,914 B1 | 1/2002 | Gavrilovic | |
| 6,362,585 B1 * | 3/2002 | Hiti et al. ..................... | 318/430 |
| 6,426,602 B1 * | 7/2002 | McCann et al. ............. | 318/432 |

(Continued)

FOREIGN PATENT DOCUMENTS

WO    WO 200120751 A2 *    3/2001

OTHER PUBLICATIONS

PCT Search Report, PCT/US03/18737, mailed Jul. 6, 2005.

*Primary Examiner*—Lincoln Donovan
*Assistant Examiner*—Renata McCloud
(74) *Attorney, Agent, or Firm*—Michael D. Smith

(57) ABSTRACT

A method for implementing control signal linearization for an electric motor is disclosed. In an exemplary embodiment, the method includes receiving a desired voltage command to be applied to the motor and determining whether the magnitude of the desired voltage command falls between a first value and a second value. If the magnitude of the desired voltage command falls between the first value and the second value, then modulating a voltage command between the first and the second value over a determined sample period, thereby resulting in the application of a modulated voltage command to the motor.

12 Claims, 7 Drawing Sheets

U.S. PATENT DOCUMENTS

| | | |
|---|---|---|
| 6,441,578 B1 | 8/2002 | Mir et al. |
| 6,541,933 B1 * | 4/2003 | Leggate et al. ............. 318/599 |
| 6,563,378 B1 | 5/2003 | Kirn |
| 6,690,135 B2 * | 2/2004 | Mir et al. ................... 318/599 |
| 6,694,287 B2 * | 2/2004 | Mir et al. ................... 702/183 |
| 6,727,669 B2 * | 4/2004 | Suzuki et al. ............... 318/139 |
| 6,798,161 B2 * | 9/2004 | Suzuki ....................... 318/434 |
| 2002/0043953 A1 * | 4/2002 | Masaki et al. .............. 318/700 |

* cited by examiner

METHOD OF INVERTER LINEARIZATION IN ELECTRIC MACHINES THROUGH SECONDARY MODULATION

CROSS-REFERENCE TO RELATED APPLICATIONS

This application claims the benefit of U.S. Provisional Application No. 60/391,562, filed Jun. 26, 2002 the contents of which are incorporated by reference herein in their entirety.

BACKGROUND

The present disclosure relates generally to automobile steering systems and, more particularly, to a method of inverter linearization in electric machines such as electric power steering (EPS) motors through secondary modulation of a motor voltage command thereto.

Electric power steering (EPS) has been recently implemented in motor vehicles to improve fuel economy and has even started to replace hydraulic power steering in certain vehicles. One way to accomplish improved fuel economy is through the reduction or elimination of losses inherent in traditional steering systems. To this end, electric power steering requires power only on demand. Commonly, in such EPS systems, an electronic controller is also configured to require significantly less power under a small or no steering input condition. This dramatic decrease from conventional steering assist is the basis of the power and fuel savings.

A polyphase permanent magnet (PM) brushless motor is typically used in EPS systems as the actuator for providing a mechanical assist to the vehicle's steering mechanism. Such a motor is generally excited with a sinusoidal field to provide lower torque ripple, noise, and vibration as compared to those motors excited with a trapezoidal field. Theoretically, if a motor controller produces polyphase sinusoidal currents with the same frequency and phase as that of the sinusoidal back electromotive force (EMF), the torque output of the motor will be a constant, and zero torque ripple will be achieved. However, due to practical limitations of motor design and controller implementation, there are always deviations from pure sinusoidal back EMF and current waveforms. Such deviations usually result in parasitic torque ripple components at various frequencies and magnitudes. Various methods of torque control can influence the magnitude and characteristics of this torque ripple.

In EPS drive systems based on a voltage mode controlled sinusoidal PM drive, a full bridge power inverter is employed to apply a pulse width modulated (PWM) voltage across the motor phases. Unfortunately, these inverters (particularly those used for sinusoidal brushless motors) suffer, however, from several linearity issues. More specifically, an inverter used in conjunction with a sinusoidal motor with phase grounding can generate considerable torque ripple at relatively low voltage commands. In addition, when the voltage command is low, the torque output versus voltage commands characteristics are fairly non linear as the result of dead time and switching time associated with the power transistors of the inverter. Accordingly, it is desirable to reduce the torque ripple and non-linearity associated with low voltage commands in EPS systems, thereby enhancing the performance of the EPS system.

SUMMARY

The above discussed and other drawbacks and deficiencies of the prior art are overcome or alleviated by a method for implementing control signal linearization for an electric motor. In an exemplary embodiment, the method includes receiving a desired voltage command to be applied to the motor and determining whether the magnitude of the desired voltage command falls between a first value and a second value. If the magnitude of the desired voltage command falls between the first value and the second value, then modulating the desired voltage command between the first and the second value over a determined sample period, thereby resulting in the application of a modulated voltage command to the motor.

Preferably, the first value is zero and the second value is a determined threshold voltage value. If the desired voltage command is greater than or equal to the second value, then the desired voltage command is not modulated between the first and said second values before being applied to the motor. In addition, a ratio is computed between the desired voltage command and the second value. Then, the computed ratio is multiplied by the sample period, thereby determining an on time for the second value. The on time represents a portion of the sample period during which the desired voltage command is modulated at the second value.

In one embodiment, the desired voltage command is modulated to the second value at the beginning of the sample period. Following the passing of the on time, the desired voltage command is modulated to the first value for the remainder of the sample period. Alternatively, a start time is obtained within the sample period, at which time the desired voltage command is to be modulated to the second value. Then, an end time is computed from the start time and the on time, the end time representing the time at which the desired voltage command is to be modulated to the first value. The start time may be randomly assigned to occur within said sample period. If the end time is initially computed to be greater than the sample period, then the end time is recomputed to be the difference between the initially computed end time and the sample period.

BRIEF DESCRIPTION OF THE DRAWINGS

Referring to the exemplary drawings wherein like elements are numbered alike in the several Figures.

DETAILED DESCRIPTION

Disclosed herein is a method of inverter linearization in electric motors (such as those used in EPS systems) through secondary modulation of a motor voltage command thereto. Briefly stated, the method overcomes the aforementioned problems by interpolating between two known "good" operating points through a secondary, time-based domain modulation. A first good operating point is established as a defined threshold voltage command value, wherein the motor is considered to exhibit acceptable torque ripple and linearity at values above the threshold. At values below the threshold, the torque ripple and linearity is considered unacceptable. The second good operating point is defined at the "zero" command, at which point the inverter also produces very low torque ripple. Thus, for command values greater than zero, but less then the threshold value, a time based modulation is implemented wherein the command is modulated to the threshold value for a period of time proportional to the relationship between the actual desired value and the threshold value.

Figure 1:
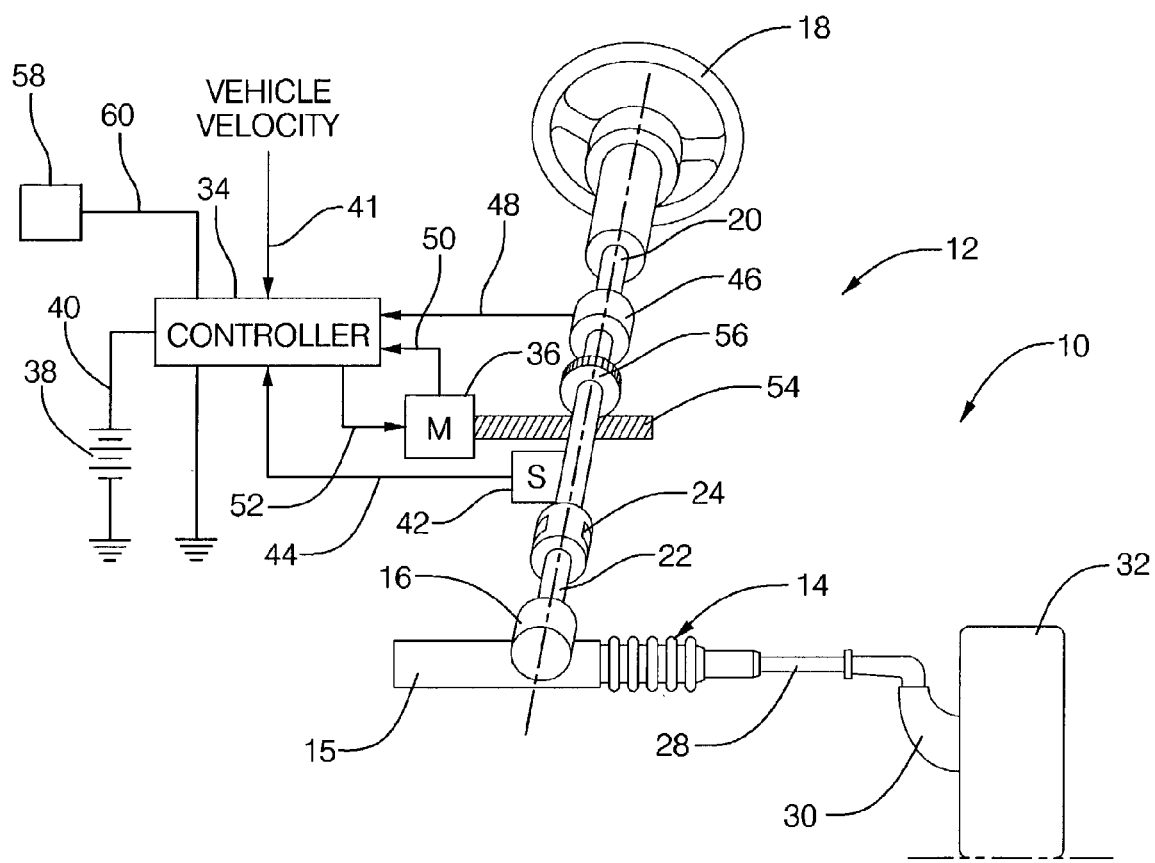
FIG. 1 is a schematic diagram of a motor vehicle provided with an electric power steering system, suitable for practicing an embodiment of the present disclosure.

Referring initially to FIG. 1, there is shown a representative environment for practicing an embodiment of the present disclosure, in which a motor vehicle 10 is provided with an electric power steering system 12. The electric power steering system 12 may include a conventional rack and pinion steering mechanism 14 having a toothed rack 15 and a pinion gear (not shown) under a gear housing 16. As the steering wheel 18 is turned, an upper steering shaft 20 turns a lower shaft 22 through a universal joint 24. The lower steering shaft 22 turns the pinion gear. The rotation of the pinion gear moves the pinion rack 15, which then moves tie rods 28 (only one shown). In turn, tie rods 28 move steering knuckles 30 (only one shown) to turn wheels 32.

An electric power assist is provided through a controller 34 and a power assist actuator comprising a motor 36. The controller 34 receives electric power from a vehicle electric power source 38 through a connection 40. The controller 34 also receives a signal 41 representative of the vehicle velocity, as well as steering pinion gear angle signal 44 from a rotational position sensor 42. As the steering wheel 18 is turned, a torque sensor 46 senses the torque applied to steering wheel 18 by the vehicle operator and provides an operator torque signal 48 to the controller 34. In addition, as the rotor of motor 36 turns, rotor position signals 50 are generated within the motor 36 and are also provided to the controller 34. In response to vehicle velocity, operator torque, steering pinion gear angle and rotor position signals received, the controller 34 derives desired motor phase voltages. The motor phase voltages are provided to motor 36 through a bus 52, thereby providing torque assist to steering shaft 20 through worm 54 and worm gear 56. As is described in greater detail later, the controller 34 is configured to develop the necessary voltage(s) to be applied to the motor 36 such that the desired torque is generated. Accordingly, a storage medium 58 may be used to contain instructions for executing a computer-implemented process within controller 34, through the transmission of data signal(s) 60 therebetween.

Figure 2:
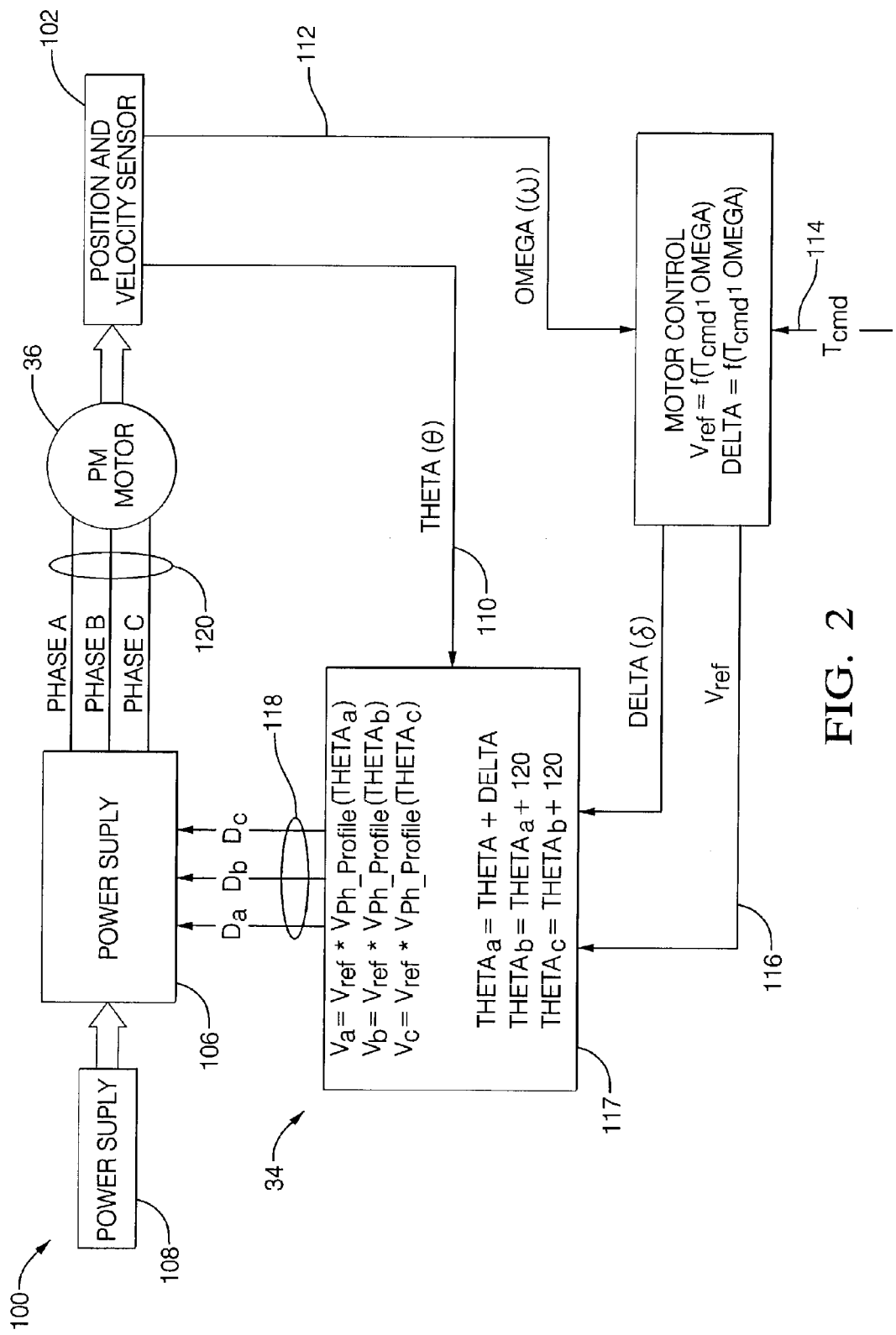
FIG. 2 is a block diagram of an exemplary PM motor control system that may be used for controlling the torque of a sinusoidally excited PM electric machine, such as the EPS motor in FIG. 1.

FIG. 2 is a block diagram of an exemplary PM motor control system 100 that may be used for controlling the torque of a sinusoidally excited PM electric machine, such as the EPS motor 36 of FIG. 1. The control system 100 includes (but is not limited to) motor 36, a motor rotor position/velocity sensor assembly 102, the controller 34, a power circuit or inverter 106 and power supply 108. The velocity sensing portion of sensor assembly 102 may be embodied by a circuit or algorithm, for example. Again, the controller 34 is configured and connected to develop the necessary voltage(s) out of inverter 106 such that, when applied to the motor 36, the desired torque is generated. Because these voltages are related to the position and speed of the motor 36, the position and speed of the motor rotor are determined by the system 100. The sensor assembly 102 is connected to the motor 36 to detect the angular position, θ, of the rotor. The sensor assembly 102 may sense the rotary position based on optical detection, magnetic field variations, or other methodologies. Exemplary position sensors include potentiometers, resolvers, synchros, encoders, and the like. The sensor assembly 102 outputs a position signal 110 indicating the angular position of the rotor.

Again, the motor speed (denoted ω) may be measured, calculated, or otherwise derived from a combination thereof. For example, the motor speed ω is calculated as the change of the motor position θ as measured by the sensor assembly 102 over a prescribed time interval. Alternatively, the motor speed ω may be determined as the derivative of the motor position θ from the equation ω=Δθ/Δt, where Δt is the sampling time and Δθ is the change in position during the sampling interval. In FIG. 2, the sensor assembly 102 determines the speed of the rotor and outputs a corresponding speed signal 112.

The position signal 110, speed signal 112, and a torque command signal 114 are each applied to the controller 34. The torque command signal 114 is representative of the desired motor torque value for the assist motor 36. The controller 34 then determines a voltage command amplitude $V_{ref}$ (shown as signal 116) and its phase advance angle δ needed to develop the desired torque according to the torque command signal 114, the position signal 110 and the speed signal 112, as well as other fixed motor parameter values. Although not shown in FIG. 2, the controller 34 could also include a linearization function block that provides a linearization offset function for $V_{ref}$ 116 in order to minimize torque ripple.

For a three-phase motor, three sinusoidal reference signals that are synchronized with the motor back EMF are utilized to generate the motor input voltages. The controller 34 thus transforms the voltage command amplitude signal $V_{ref}$ 116 into three phases as shown in function block 117 by determining individual phase voltage command signals $V_a$, $V_b$, and $V_c$ from the voltage command amplitude signal 116 and the position signal 110 according to the following equations:

$$V_a = V_{ref} * V_{ph\_Profile}(\theta_a)$$

$$V_b = V_{ref} * V_{ph\_Profile}(\theta_b)$$

$$V_c = V_{ref} * V_{ph\_Profile}(\theta_c)$$

where $V_{ph\_Profile}(\theta_a)$, $V_{ph\_Profile}(\theta_b)$, $V_{ph\_Profile}(\theta_c)$ are profile voltages generated from the sine functions as shown in the following equations:

$$V_{ph\_Profile}(\theta_a) = \sin(\theta_a) - \min[\sin(\theta_a), \sin(\theta_b), \sin(\theta_c)]$$

$$V_{ph\_Profile}(\theta_b) = \sin(\theta_b) - \min[\sin(\theta_a), \sin(\theta_b), \sin(\theta_c)]$$

$$V_{ph\_Profile}(\theta_c) = \sin(\theta_c) - \min[\sin(\theta_a), \sin(\theta_b), \sin(\theta_c)]$$

These functions are used to generate a phase to grounding phase voltage waveform. More particularly, the functions may be generated from the sine functions off line and stored in a tabular form (such as in a look-up table), or they may be calculated directly using the above equations. $\theta_a$, $\theta_b$, and $\theta_c$ are the individual phase voltage angles, shifted by 120 electrical degrees from one another, such that:

$$\theta_a = \theta_a + \delta$$

$$\theta_b = \theta_a + 120°$$

$$\theta_c = \theta_b + 120°$$

In a motor drive system employing phase advancing, the phase advancing angle δ may also be calculated as a function of the input signal for torque or speed. The phase advancing angle δ is defined as the angle between the phase voltage vector V and back electromotive force (EMF) vector E as generated by the motor 36 as it rotates. The phase voltage signals $V_a$, $V_b$, and $V_c$ are phase shifted by the phase advancing angle δ. Phase voltage command signals $V_a$, $V_b$, and $V_c$ are used to generate the motor duty cycle commands $D_a$, $D_b$, and $D_c$ 118 using an appropriate pulse width modulation (PWM) technique. Motor duty cycle commands 118 of the controller 34 are processed into on-off control command signals applied to the respective switching devices of the power circuit or inverter 106, which is coupled with a power supply 108 to apply modulated phase voltage signals 120 to the stator windings of the motor in response to the motor voltage command signals.

Figure 3:
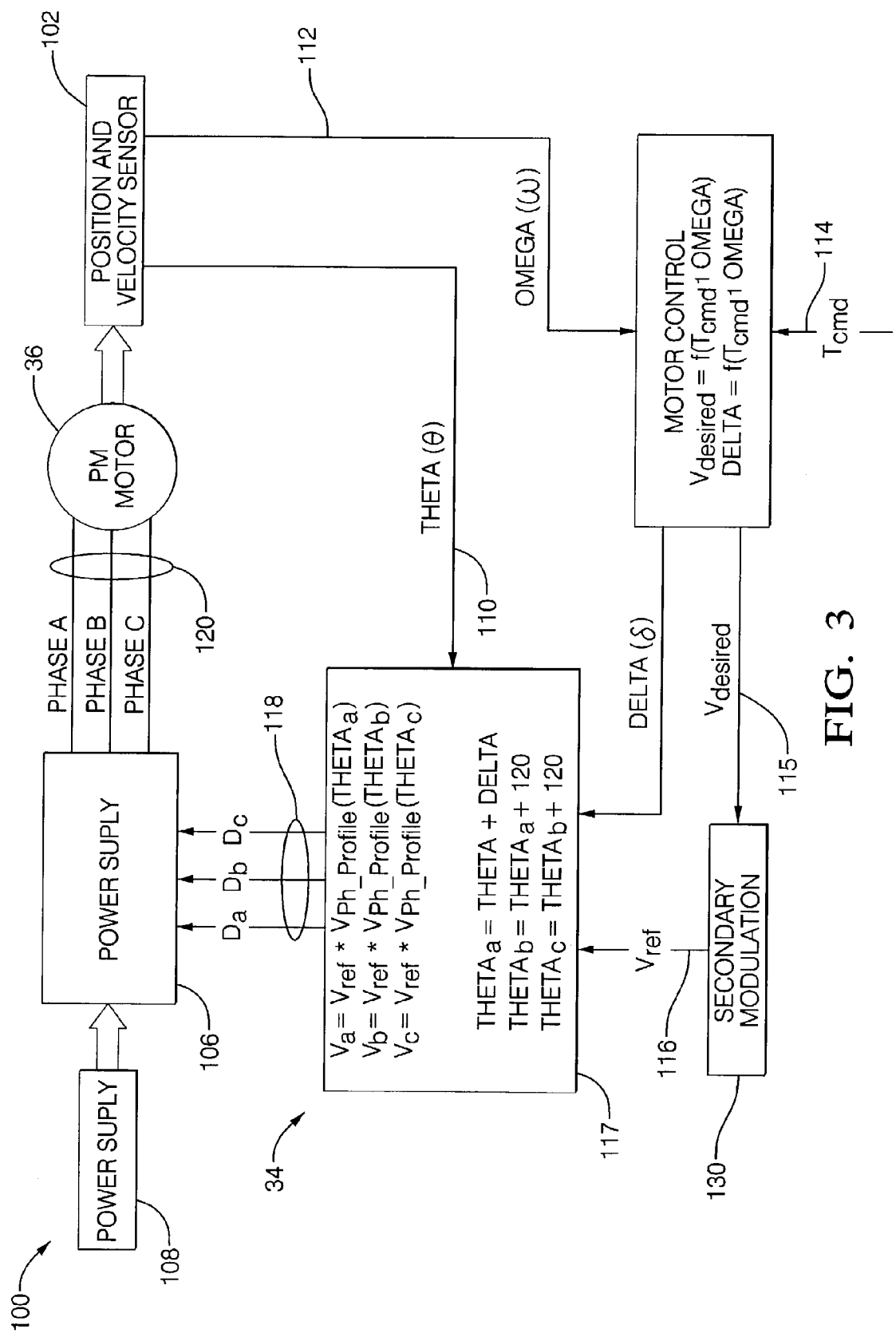
FIG. 3 is a modified block diagram of the motor control system shown in FIG. 2, in accordance with an embodiment of the invention, illustrating the addition of a secondary modulation block for implementing a secondary time-based modulation of the voltage command signal.

As stated previously, at relatively low voltage commands (i.e., signal $V_{ref}$ 116), there is generated considerable torque ripple in addition to fairly non linear torque output versus voltage commands, as the result of dead time and switching time associated with the power transistors of the inverter. 106. Accordingly, FIG. 3 is a modified block diagram of the exemplary PM motor control system 100 shown in FIG. 2, with the addition of a secondary modulation block 130 for implementing the above mentioned, secondary time based modulation of a target voltage command signal 115 (the same as the previous voltage command signal $V_{ref}$ 116 in FIG. 2) at relatively low voltage commands. This secondary modulation is implemented before the phase angle δ information is combined with a new modulated voltage command signal once again denoted as $V_{ref}$ 116 to derive the individual phase voltage command signals, and is carried out only when the value of the desired voltage command signal $V_{desired}$ 115 is below a threshold value.

Figure 4:
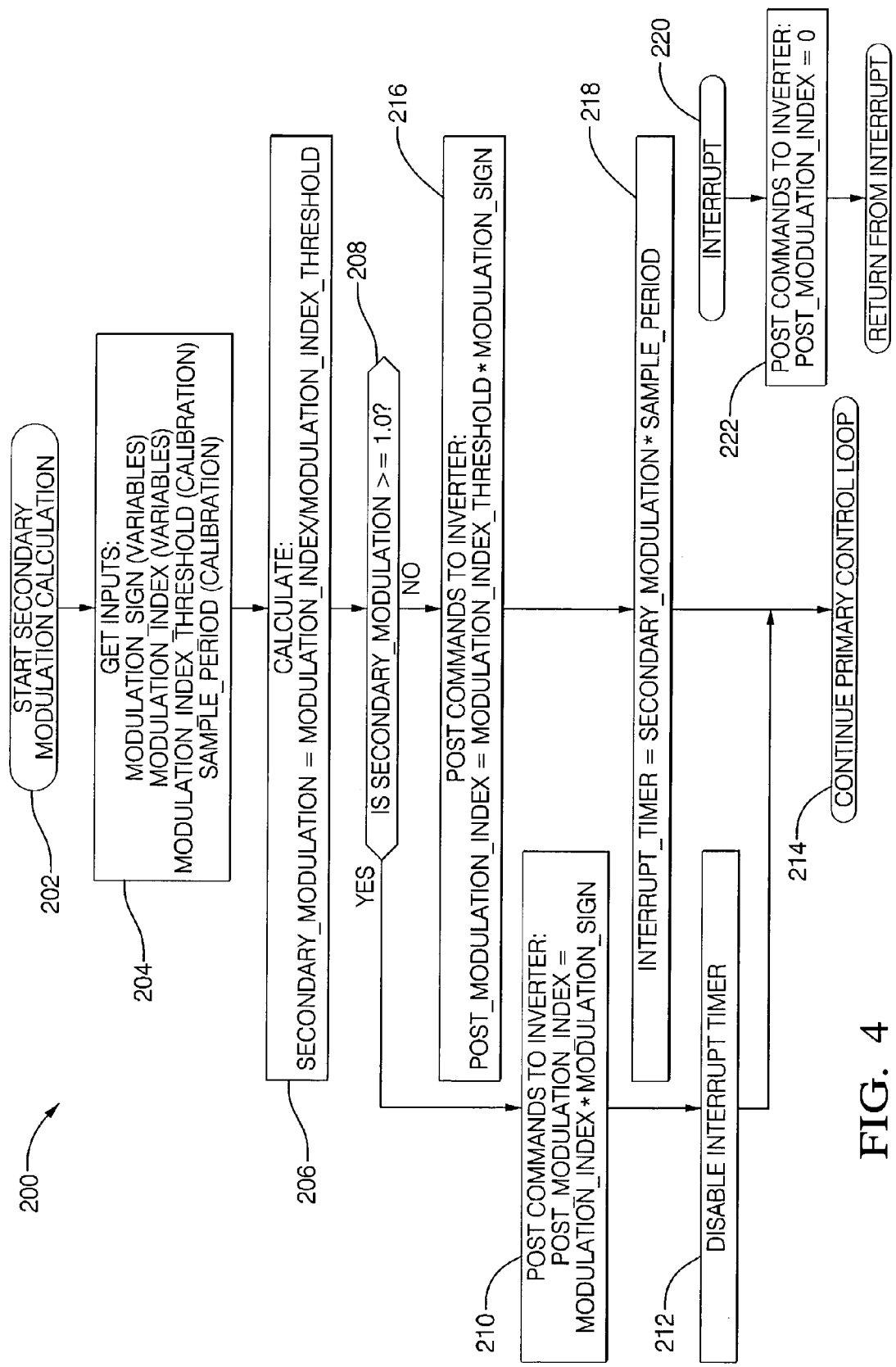
FIG. 4 is a flow diagram illustrating a first embodiment of a method for implementing the secondary modulation shown in FIG. 3.

Referring now to FIG. 4, there is shown a flow diagram of a method 200 for implementing inverter linearization of a brushless electric machine through secondary modulation. In a first embodiment, the method 200 includes an algorithm that commences at block 202 by beginning secondary modulation calculations to determine whether the secondary modulation will be implemented, under the conditions described above. At block 204, various inputs used by the algorithm are received. These inputs are representative of actual system inputs, such as the desired voltage command signal $V_{desired}$ 115 and the voltage command threshold value ($V_{th}$) at which it is determined there is satisfactory torque ripple and linearity performance in the system. More specifically, the values representing $V_{desired}$ 115 are Modulation_Sign and Modulation_Index, which respectively represent the sign and the magnitude of $V_{desired}$ 115. In addition, the threshold voltage $V_{th}$ is represented by the variable entitled Modulation_Index_Threshold. It will be appreciated that the specific value of Modulation_Index_Threshold calibrated into the algorithm may be determined empirically, by simulation or other suitable means.

Proceeding to block 206, the algorithm then determines the variable entitled Secondary_Modulation, which is the ratio of Modulation_Index to Modulation_Index_Threshold. In other words, this ratio compares the desired voltage command signal $V_{desired}$ 115 to the threshold voltage to see whether secondary modulation will be carried out. At decision block 208, it is determined whether Secondary_Modulation is greater than or equal to 1 (i.e., whether the desired voltage command signal $V_{desired}$ 115 is greater than or equal to the threshold voltage). If so, the algorithm proceeds to block 210, where the desired voltage command signal $V_{desired}$ 115 information is passed through for conversion to phase voltage command processing. Specifically, the value of Modulation_Index is combined with the value of Modulation_Sign and thereafter passed along to the inverter. Further, at block 212, an interrupt timer is disabled, the function of which is described hereinafter. The secondary modulation subroutine exits at block 214.

On the other hand, if at decision block 208 it is determined that Secondary_Modulation is less than 1 (i.e., the desired voltage command signal $V_{desired}$ 115 is less than the threshold voltage), then the algorithm proceeds to block 216, where the desired voltage command signal $V_{desired}$ 115 is modulated to the threshold value. That is, Modulation_Index is now set equal to Modulation_Index_Threshold (the first "good" operating point), multiplied by the value of Modulation_Sign. However, in order to accurately derive the modulated voltage command signal $V_{ref}$ 116, the desired voltage command signal $V_{desired}$ 115 is at some point be modulated to zero (the second "good" operating point) prior to the expiration of the nominal sample period of the signal (e.g., 2 milliseconds). The calibration Sample_period is also shown in block 204.

Accordingly, at block 218 the variable Interrupt_Timer is calculated, which determines the amount of time within the sample period that the command signal is held at the threshold value. This variable directly correlates with how close the desired voltage command signal $V_{desired}$ 115 is to the threshold voltage. For example, if the desired voltage command signal $V_{desired}$ 115 is 90% of the threshold voltage, then the desired voltage command signal $V_{desired}$ 115 is modulated to the threshold voltage for the first 90% of the sample period (e.g., 1.8 ms), and then modulated to zero for the remaining 10% of the sample period (e.g., 0.2 ms) to form the resulting modulated voltage command signal $V_{ref}$ 116. An interrupt subroutine is shown at block 220, during which time Modulation_Index is set to zero at block 222.

In the algorithm embodiment of FIG. 4, the modulation of Modulation_Index to Modulation_Index_Threshold (for whatever applicable time period) is done at the beginning of the sample period. Since this particular method of modulation could result in unwanted mechanical noise caused by a pure tone at a high amplitude, it may be desirable to implement a pseudo random modulation pattern such that the modulation to the threshold value is not always commenced at the beginning of the sample period. By varying the start time of the secondary modulation pulse, a broadband of noise at a low amplitude is created, thereby minimizing the overall noise generation. Accordingly, FIG. 5 illustrates an alternative embodiment of the algorithm in FIG. 4.

Figure 5:
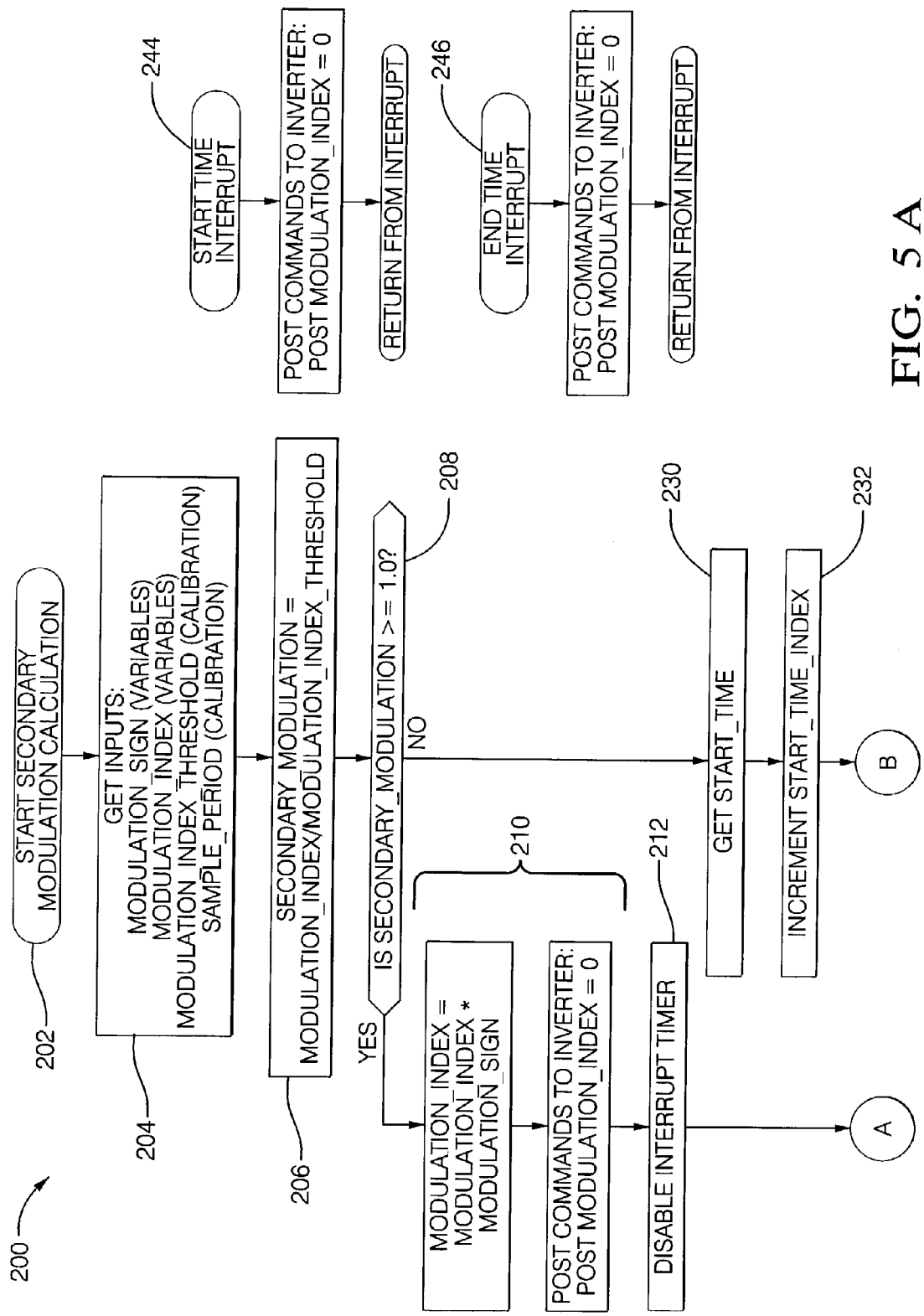
FIG. 5 is a flow diagram illustrating an alternative embodiment of the method for implementing the secondary modulation shown in FIG. 4.
Figure 5B:
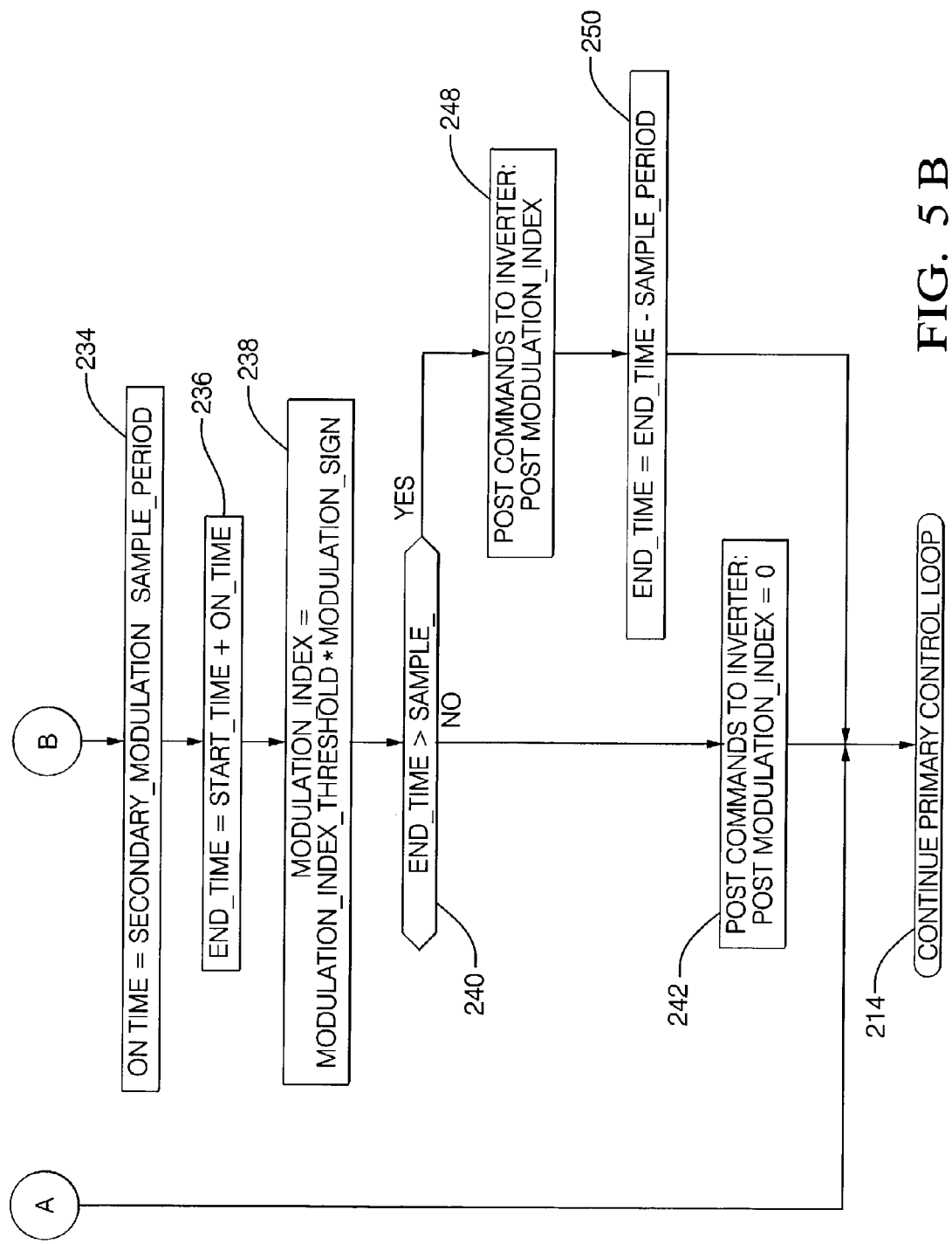

For ease of description, similar algorithm block elements in the flow diagram FIG. 5 are labeled with the same reference numeral as in shown FIG. 4. In this embodiment, when it is determined at decision block 208 that Secondary_Modulation is not greater than or equal to 1, then the method 200 proceeds to block 230, where the start time information is obtained. As stated earlier, the start time may be one of a number of individual, preselected start times that changes with each successive sample period. For example, with a sample period of 2000 μs (2 milliseconds), the algorithm could be configured such that the start time may begin anywhere within that period. At block 232, the start time index is incremented such that a different start time will be obtained during the next sample period. It will be appreciated, however, that the manner of changing the start time could be accomplished in other ways. Additional information concerning pulse width modulation control within a sample period may be found in U.S. Pat. No. 5,589,805 to Zuraski, et al., the contents of which are incorporated herein by reference in their entirety.

Regardless of the exact start time within the sample period, the amount of time that the desired voltage command signal $V_{desired}$ 115 is held at the threshold value (On_Time) is determined by Secondary_Modulation multiplied by Sample_Period, as shown at block 234. Then, the end time (End_Time) is computed by adding the start time to the on time, as shown at block 236. The end time will determine the point in time at which the desired voltage command signal $V_{desired}$ 115 is modulated back to zero. Proceeding to block 238, the modulation index is set to the threshold value multiplied by the directional sign.

So long as the computed end time does not exceed the value of the sample period time, there is no need to modify the value of End_Time to conform to the sample period. Accordingly, at decision block 240, if it is determined that End_Time is not greater than Sample_Period, then the method proceeds to block 242, where the desired voltage command signal $V_{desired}$ 115 is modulated to zero to begin the sample period. Once the start time is reached, a start time interrupt subroutine is engaged at block 244, during which time the desired voltage command signal $V_{desired}$ 115 is modulated to the present value of Modulation_Index (which was set to the signed value of the threshold level at block 238). Then, once the computed end time is reached, an end time subroutine 246 will take over to modulate the command signal back to zero before continuing with the primary control loop.

In contrast, if it is determined at block 240 that the computed end time exceeds the sample period, then the end time is in effect "wrapped around" to the beginning of the sample period. First, at block 248, the desired voltage command signal $V_{desired}$ 115 is posted at the threshold value to begin the sample period. The end time is then recomputed at block 250 to be the difference between the old end time less the sample period. Once this new end time is reached, the end time interrupt subroutine will be activated, wherein the desired voltage command signal $V_{desired}$ 115 is modulated to zero. Finally, the start time will be reached, at which time the desired voltage command signal $V_{desired}$ 115 will again be modulated back to the threshold value for the remainder of the sample period.

Figure 6:
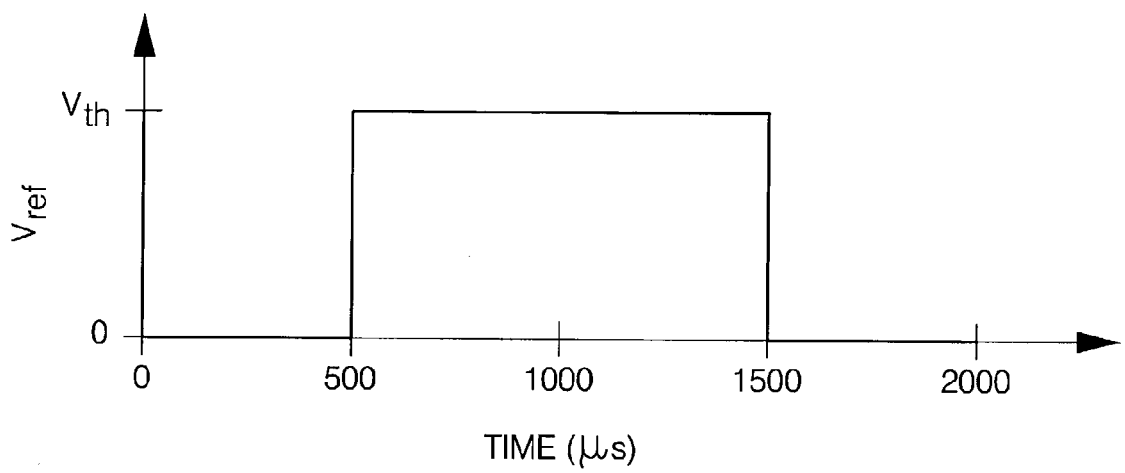
FIGS. 6(a) and 6(b) are signal waveform illustrating an example of the PWM technique of the embodiment in FIG. 5.
Figure 6:
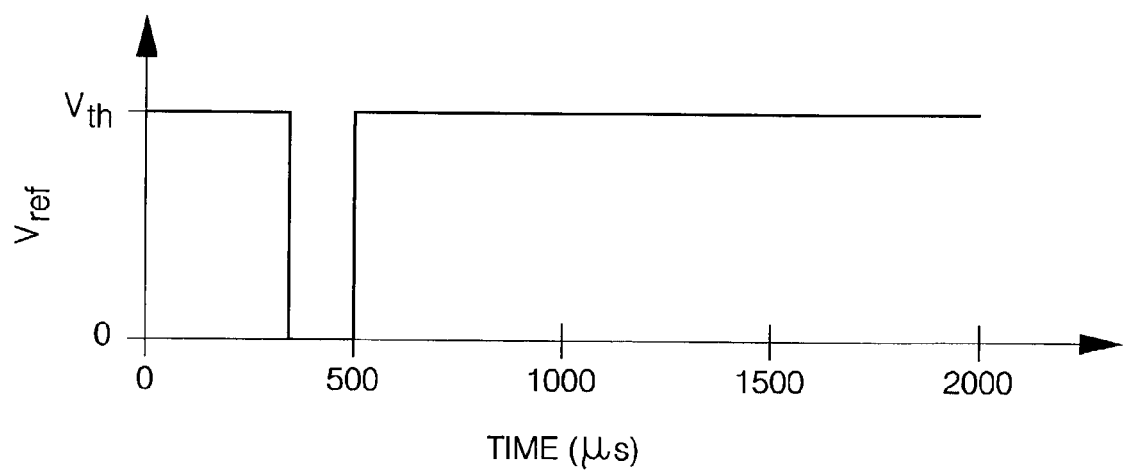

FIGS. 6(a) and 6(b) are timing diagrams that provide an illustrative example of the PWM technique used in the algorithm of FIG. 5. In each case, the exemplary sample period is 2000 μs and the start time is selected at 500 μs. First, FIG. 6(a) illustrates the resulting modulated voltage command signal $V_{ref}$ 116 waveform when the secondary modulation is determined to be 50% (i.e., the total on time for the threshold voltage is 1000 μs). From block 236, the end time is the start time plus the on time, or 1500 μs. Since this total does not exceed the sample period of 2000 μs, there is no need to recompute the end time. Accordingly, the sample period begins with Modulation_Index being modulated at zero (block 242). Then, at the start time of 500 μs, the start time interrupt block 244 causes Modulation_Index to be modulated up to the signed threshold value for a duration of 1000 μs, after which time the end time interrupt block modulates the signal back to zero for the remaining 500 μs in the sample period.

However, if the desired voltage command signal $V_{desired}$ 115 is such that secondary modulation is determined to be 90% (i.e., the total on time for the threshold voltage is 1800 μs), the end time will be recomputed for a start time of 500 μs, since 500 μs+1800 μs=2300 μs. In this case, the waveform is initially modulated to the threshold value to begin the sample period, and the end time is recomputed as 2300 μs−2000 μs=300 μs. Thus, between sample time period t=0 and t=300 μs, the output is at the threshold value. Then, at t=300 μs, the end time subroutine causes the output to be modulated to zero until at t=500 μs, the start time subroutine causes the output to be modulated back up to the threshold value for the remainder of the sample period. It can be seen, then, that the PWM signal pattern is "wrapped around" in the sense that the end time occurs before the start time in this example. However, regardless of the location of the start time, the end result is the same; that is, the signal is modulated to the threshold value for 90% of the total sample period.

Through the use of the above described secondary time-based modulation techniques, the potential for audible noise is reduced by minimizing the operating space where such noise might occur, since the operating range benefiting most from the technique is dominated by Coulomb friction and where the output of the inverter has a relatively low gain. This modulation technique is different than existing techniques in that, among other aspects, it is imposed before the phase angle information is combined with the motor voltage command signal 116 and occurs only when the desired voltage command signal value $V_{desired}$ 115 is below the threshold value.

As will be appreciated, the disclosed invention can be embodied in the form of computer or controller implemented processes and apparatuses for practicing those processes. The present invention can also be embodied in the form of computer program code containing instructions embodied in tangible media 58, such as floppy diskettes, CD-ROMs, hard drives, or any other computer-readable storage medium, wherein, when the computer program code is loaded into and executed by a computer or controller, the computer becomes an apparatus for practicing the invention. The present invention may also be embodied in the form of computer program code or signal 60, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for controlling an electric motor, the method comprising:
   determining whether a magnitude of a desired voltage command falls between a first value and a second value utilizing a controller, the second value being greater than the first value; and
   if said magnitude of said desired voltage command falls between said first value and said second value, then pulse width modulating said desired voltage command between said first value and said second value over a determined sample period, thereby resulting in a modulated voltage command utilizing said controller;
   generating a first set of motor duty cycle commands based upon the modulated voltage command, utilizing said controller, said first set of motor duty cycle commands being received by an inverter operably coupled to said electric motor;
   generating a first set of modulated phase voltage signals based on the first set of motor duty cycle commands for controlling said electric motor, utilizing said inverter; and
   if said magnitude of said desired voltage command is greater than or equal to said second value, then generating a second set of motor duty cycle commands based upon said desired voltage command, utilizing said controller, said second set of motor duty cycle commands being received by said inverter; and
   generating a second set of modulated phase voltage signals based on said second set of motor duty cycle commands for controlling said electric motor, utilizing said inverter.

2. The method of claim 1, further comprising:
   computing a ratio between said desired voltage command and said second value; and
   multiplying said computed ratio by said time period, thereby determining an on time for said second value, said on time representing a portion of said time period when said desired voltage command is pulse width modulated to said second value.

3. The method of claim 2, further comprising:
   pulse width modulating said desired voltage command to said second value at a beginning of said time period; and
   following passage of said on time, pulse width modulating said desired voltage command to said first value for a remainder of said time period.

4. The method of claim 2, further comprising:
   obtaining a start time within said time period, when said desired voltage command is to be pulse width modulated to said second value;
   computing an end time from said start time and said on time, said end time representing a time when said desired voltage command is to be pulse width modulated to said first value;
   wherein said start time is randomly assigned to occur within said time period.

5. The method of claim 4, wherein if said end time is initially computed to be greater than said time period, then said end time is recomputed to be a difference between said initially computed end time and said time period.

6. A method for controlling an electric motor the method comprising:
   determining a desired voltage command signal from a torque command signal and a motor speed signal, utilizing a controller;
   determining a phase advancing angle from said torque command signal and said motor speed signal, utilizing said controller;
   determining whether a magnitude of said desired voltage command signal falls between a first value and a second value, said second value being greater than said first value, utilizing said controller;
   if said magnitude of said desired voltage command signal falls between said first value and said second value, then pulse width modulating said desired voltage command signal between said first value and said second value over a determined time period, thereby resulting in a pulse width modulated voltage command, utilizing said controller;
   generating a first set of motor duty cycle commands to be applied to an inverter coupled to said motor based upon a motor position signal, said phase advancing angle, and the pulse width modulated voltage command, utilizing said controller;
   generating a first set of modulated phase voltage signals based on said first set of motor duty cycle commands for controlling said electric motor, utilizing said inverter;
   if said magnitude of said desired voltage command is greater than or equal to said second value, then not pulse width modulating said desired voltage command signal, and
   generating a second set of motor duty cycle commands to be applied to said inverter coupled to said motor based upon a motor position signal, said phase advancing angle and said desired voltage command signal; and
   generating a second set of modulated phase voltage signals based on said second set of motor duty cycle command for controlling said electric motor, utilizing said inverter.

7. The method of claim 6, further comprising:
   computing a ratio between said desired voltage command signal and said second value; and
   multiplying said computed ratio by said time period, thereby determining an on time for said second value, said on time representing a portion of said time period when said voltage command signal is pulse width modulated to said second value.

8. The method of claim 7, further comprising:
   pulse width modulating said desired voltage command signal to said second value at a beginning of said time period; and
   following passage of said on time, pulse width modulating said desired voltage command signal to said first value for a remainder of said time period.

9. The method of claim 7, further comprising:
   obtaining a start time within said time period, when said desired voltage command signal is to be pulse width modulated to said second value;
   computing an end time from said start time and said on time, said end time representing a time when said desired voltage command signal is to be pulse width modulated to said first value;
   wherein said start time is randomly assigned to occur within said time period.

10. The method of claim 9, wherein if said end time is initially computed to be greater than said time period, then said end time is recomputed to be a difference between the initially computed end time and said time period.

11. An electric power steering system, comprising:
a steering input device coupled to one or more steerable wheels;
an assist actuator including an electric motor for providing an assist torque to said one or more steerable wheels,
an inverter operably coupled to said electric motor;
a controller operably coupled to said inverter,
said controller configured to determine whether a magnitude of a desired voltage command falls between a first value and a second value, the second value being greater than the first value; and if said magnitude of said desired voltage command falls between said first value and said second value, then pulse width modulating said desired voltage command between said first value and said second value over a determined sample period, thereby resulting in a modulated voltage command;
said controller further configured to generate a first set of motor duty cycle commands based upon the modulated voltage command, said first set of motor duty cycle commands being received by an inverter operably coupled to said electric motor;
said inverter configured to generate a first set of modulated phase voltage signals based on the first set of motor duty cycle commands for controlling said electric motor;
said controller further configured to generate a second set of motor duty cycle commands based upon said desired voltage command, if said magnitude of said desired voltage command is greater than or equal to said second value, said second set of motor duty cycle commands being received by said inverter; and
said inverter further configured to generate a second set of modulated phase voltage signals based on said second set of motor duty cycle commands for controlling said electric motor.

12. A computer storage medium readable by a computer and storing instructions for execution by said computer for facilitating a method comprising:
determining whether a magnitude of a desired voltage command falls between a first value and a second value, said second value being greater than said first value; and
if said magnitude of said desired voltage command falls between said first value and said second value, then pulse width modulating said desired voltage command between said first value and said second value over a determined time period, thereby resulting in a modulated voltage command; and
generating a first set of motor duty cycle commands based upon said modulated voltage command, said first set of motor duty cycle commands being received by an inverter operably coupled to an electric motor for controlling said electric motor;
if said magnitude of said desired voltage command is greater than or equal to said second value, then generating a second set of motor duty cycle commands based upon said desired voltage command, said second set of motor duty cycle command being received by said inverter for controlling said electric motor.

* * * * *